F. W. GOERDES.
IGNITER.
APPLICATION FILED OCT. 19, 1910.
1,004,868.
Patented Oct. 3, 1911.
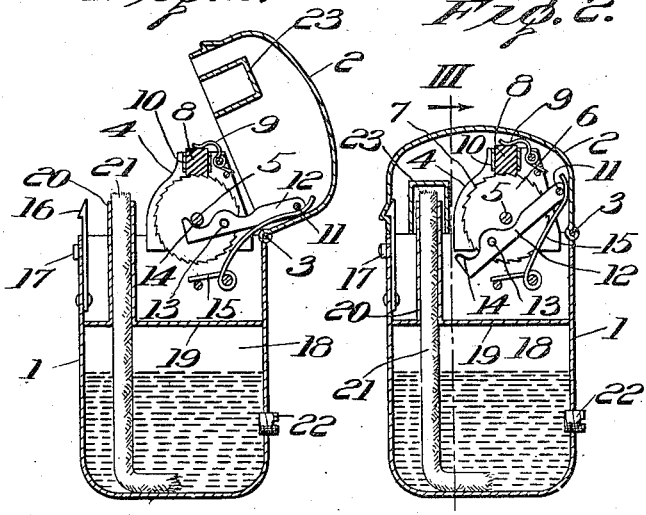
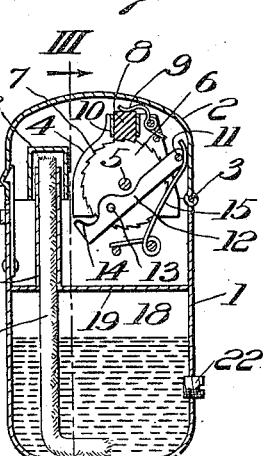
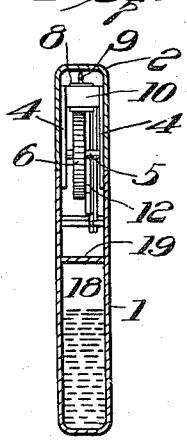
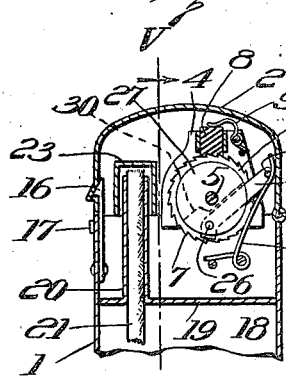
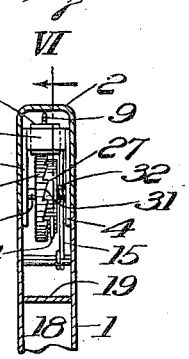
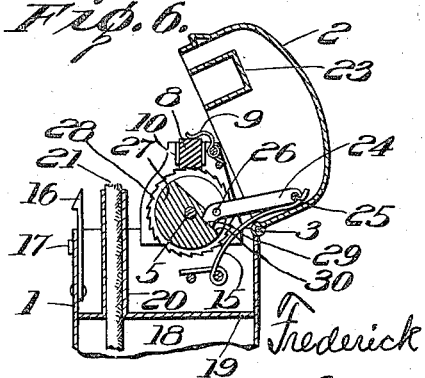
Witnesses:
Edmund Quincy Moses
Gerald E. Terwilliger
Frederick W. Goerdes, Inventor
By his Attorney
Edward Davis

UNITED STATES PATENT OFFICE.

FREDERICK W. GOERDES, OF NEWARK, NEW JERSEY, ASSIGNOR TO AMERICAN BUTTON COMPANY, OF NEWARK, NEW JERSEY, A CORPORATION OF NEW JERSEY.

IGNITER.

1,004,868.  Specification of Letters Patent.  Patented Oct. 3, 1911.

Application filed October 19, 1910. Serial No. 587,814.

*To all whom it may concern:*

Be it known that I, FREDERICK W. GOERDES, a citizen of the United States, residing in the city of Newark, county of Essex, and State of New Jersey, have invented certain new and useful Improvements in Igniters, of which the following is a specification.

My invention relates broadly to means for producing a flame without the use of fulminates, and specifically to igniters of such a type adapted to be arranged in compact form for pocket use.

In my improved device I provide a wheel having cutting teeth adapted to be rotated in contact with an abrasive substance in such manner that fine particles of the latter will be cut off, the heat produced by this action being sufficient to raise the particles to incandescence and thus form a series of sparks, which, impinging upon a wick saturated with a volatile substance, the fumes of which are ignitible, will readily produce a flame. I am aware that prior devices have been made with the same general end in view, wherein a serrated steel or hardened iron wheel has been rotated in contact with some hard or flinty substance, such for instance, as emery. The action of such devices has been wholly abrasive, however, whereas in my improved igniter chips of the abrasive substance are actually cut cleanly from the block of such substance, producing highly efficient sparks. My improved device also comprehends the advantage of compactness with positiveness of action and is in effect automatic.

In the accompanying drawings which form a part of this specification, Figure 1 is a sectional view of my device, showing the operating parts in detail, the cover being shown in the raised position; Fig. 2 is a similar view with the cover closed; Fig. 3 is a transverse sectional view on line III—III of Fig. 2; Fig. 4 is a fragmentary sectional view similar to Fig. 2, illustrating a modification; Fig. 5 is a transverse sectional view on line V—V of Fig. 4, and Fig. 6 is a sectional view taken on line VI—VI of Fig. 5.

Referring to the drawings in detail, the numeral 1 designates a case having a cover 2 attached thereto by the hinge 3. Rigidly attached to the case are the upright plates 4 in which is pivoted the axle 5, which carries the wheel 6 having the cutting teeth 7. This wheel I preferably make of hardened steel. Bearing against the teeth of the wheel is the block 8 of abrasive material which is forced against the wheel by the spring 9. I preferably use as abrasive material the substance commonly known in the trade as cerium, which has properties peculiarly adapting it for use in this connection. A guide 10 is provided for keeping the abrasive material in proper alinement with respect to the wheel. Pivoted to a pin 11 fixed in the cover is the link member 12, which is pivoted near its other extremity to a pin 13 fixed to the wheel. This link is provided with a shouldered portion 14 adapted to act as a stop, limiting the motion of the cover, when it is raised, by contact with the axle 5, as illustrated in Fig. 1. A spring 15 is provided for raising the cover when the catch 16 is pressed inwardly by the button 17.

Formed within the case is a cavity 18 separated from the remainder of the case by a partition 19. Upwardly extending from this partition is a tubular structure 20 through which may pass the wick 21, preferably formed of asbestos or some other non-combustible fibrous material, the lower end of the wick being adapted to be immersed in some volatile and easily ignitible liquid, such as benzine, gasolene or alcohol, confined within the cavity 18. The supply of liquid may be replenished by removing the screw 22.

Formed in the cover is a tubular structure 23, closed at one end and adapted to inclose the exposed end of the wick when the cover is closed, thus extinguishing the flame produced by the sparks generated through the action of the wheel upon the abrasive material striking the saturated wick when the cover is opened.

In Figs. 4, 5 and 6, I have illustrated a modification similar in function and operation to the device above described, but differing therefrom in the means used for rotating the toothed wheel when the cover is raised. In these figures I have shown a link 24 pivoted to the pin 25 fixed to the cover and pivoted near its other extremity to a pin 26 passing through a slotted disk 27 adjacent to the toothed wheel 28. One end of the link 24 is provided with a turned up end 29 adapted to strike the limiting surface 30 of the slot in the disk 27 when the cover is raised, and thereby act as a stop to its motion as illustrated in Fig. 6. The side of this disk is provided with a series of ratchet teeth 31 adapted to engage a similar series of teeth formed upon the adjacent face of the toothed wheel. The spring 32 is provided for forcing the teeth to remain in engagement.

The release of the catch 16 permits the spring 15 to force the cover upwardly into the position shown in Fig. 6. When this action takes place the link is forced to change its position, thereby rotating the toothed wheel through the action of the ratchet teeth of the slotted disk upon the ratchet teeth of the toothed wheel. When the cover is closed, however, the slotted disk is rotated in the reverse direction, but the ratchet teeth of the disk then ride over the ratchet teeth on the toothed wheel, and there is no rotation of the latter. To accommodate this action the link 24 moves laterally upon the pin 25 a distance sufficient to permit the ratchet teeth of the disk to ride over the ratchet teeth of the wheel. Wear upon the toothed wheel is thus reduced to a minimum.

While I have illustrated and described only two specific embodiments of my invention, I realize that it is capable of broad application, and I do not desire to be limited to the forms shown and described.

Having thus described my invention, I claim:

1. In an igniter, in combination, a case, a cover therefor, means for locking and releasing said cover, a spring for opening said cover when released, a rotary cutting member provided with ratchet teeth on one side thereof, a block of spark-producing alloy in contact therewith, a ratchet disk having teeth on one side thereof adapted to engage the ratchet teeth on the cutting member, a pin secured to the cover, and a link pivoted to said pin and said ratchet disk, said link being permitted substantial lateral movement along said pin.

2. In an igniter, in combination, a case, a cover therefor, means for locking and releasing said cover, a spring for opening said cover when released, a rotary cutting member, a block of spark-producing alloy in contact therewith, a ratchet disk having teeth on one side thereof adapted to engage said cutting member, a pin secured to and extending from one wall of the cover to the opposite wall, and a link pivoted to said pin and said ratchet disk, said link being permitted substantial lateral movement along said pin.

3. In an igniter, in combination, a case, a cover therefor, means for locking and releasing said cover, a spring for opening the cover when released, a rotary cutting member having ratchet teeth on one side thereof, a block of abrasive material in contact with the cutting edge of said member, a ratchet disk having ratchet teeth on one side thereof adapted to engage the teeth on said rotary cutting member, resilient means for forcing said teeth into engagement, a link pivoted to said disk and to the cover and capable of lateral movement at the point where it is pivoted to the cover, said link and disk operating to rotate the cutting member when the cover is being opened and to permit said member to remain stationary when the cover is being closed.

4. In an igniter, in combination, a case, a cover therefor, means for locking and releasing said cover, a rotary cutting member, a block of abrasive material, means for maintaining the same in contact with said rotary member, a ratchet disk having a slot therein, a link operated by movement of said cover entering said slot and pivoted to said disk, said link and disk operating to rotate the cutting member when the cover is being opened and to permit said member to remain stationary when the cover is being closed.

5. In an igniter, in combination, a case, a cover therefor, means for locking and releasing said cover, a rotary cutting member, a block of abrasive material, means for maintaining the same in contact with said rotary member, a ratchet disk having a slot therein, a link pivoted to said disk at a point within the slot therein, means for causing said link to be positively moved by a movement of the cover, said link and disk operating to revolve the cutting member when the cover is being opened and to permit said member to remain stationary when the cover is being closed.

6. In an igniter, in combination, a case, a cover therefor, means for locking and releasing said cover, a rotary cutting member, a block of abrasive material, means for maintaining the same in contact with said rotary member, a ratchet disk having a slot therein, a link entering said slot and pivoted to said disk and to said cover, said link being capable of limited lateral movement at the point where it is pivoted to the cover, the link and disk operating to rotate the cutting member when the cover is being opened and to permit said member to remain stationary when the cover is being closed.

7. In an igniter, in combination, a case, a cover therefor, means for locking and releasing said cover, a rotary cutting member, a block of abrasive material in contact therewith, a ratchet disk, a link pivoted to said disk, means for positively moving said link by a movement of the cover, said link having an abutment thereon adapted to engage a portion of said disk and limit the motion of said disk and cover.

8. In an igniter, in combination, a case, a cover therefor, means for locking and releasing said cover, a rotary cutting member, a block of abrasive material in contact therewith, a ratchet disk having a slot therein, a link pivoted to the disk at a point within the slot therein, means for positively moving said link by a movement of the cover, said link having an abutment thereon adapted to engage a wall of said slot and thereby limit the motion of the cover.

FREDERICK W. GOERDES.

Witnesses:
   GERALD E. TERWILLIGER,
   LOUIS V. TONERO.